US009305051B2

(12) United States Patent
Punera et al.

(10) Patent No.: US 9,305,051 B2
(45) Date of Patent: Apr. 5, 2016

(54) MINING BROAD HIDDEN QUERY ASPECTS FROM USER SEARCH SESSIONS

(75) Inventors: Kunal Punera, Santa Clara, CA (US); Deepayan Chakrabarti, Sunnyvale, CA (US); Xuanhui Wang, Urbana, IL (US)

(73) Assignee: Yahoo! Inc., Sunnyvale, CA (US)

( * ) Notice: Subject to any disclaimer, the term of this patent is extended or adjusted under 35 U.S.C. 154(b) by 1178 days.

(21) Appl. No.: 12/332,187

(22) Filed: Dec. 10, 2008

(65) Prior Publication Data

US 2010/0145944 A1 Jun. 10, 2010

(51) Int. Cl.
*G06F 17/30* (2006.01)
(52) U.S. Cl.
CPC .............................. *G06F 17/30395* (2013.01)
(58) Field of Classification Search
None
See application file for complete search history.

(56) References Cited

U.S. PATENT DOCUMENTS

| | | | | |
|---|---|---|---|---|
| 2006/0190436 A1* | 8/2006 | Richardson et al. | ............... | 707/3 |
| 2006/0212265 A1* | 9/2006 | Amitay et al. | ................ | 702/182 |
| 2007/0266002 A1* | 11/2007 | Chowdhury et al. | ............. | 707/2 |
| 2008/0114721 A1* | 5/2008 | Jones et al. | ......... | 707/2 |
| 2009/0292700 A1* | 11/2009 | Castellani et al. | ................ | 707/6 |

OTHER PUBLICATIONS

J. A. Aslam, E. Pelekov, and D. Rus. The star clustering algorithm for static and dynamic information organization. Journal of Graph Algorithms and Applications, 2004.*

Xuanhui Wang and ChengXiang Zhai. Mining term association patterns from search logs for effective query reformulation. CIKM, 2008.*

K-Means. K-Means Clustering Overview. https://web.archive.org/web/20050429095658/http://www.improvedoutcomes.com/docs/WebSiteDocs/Clustering/K-Means_Clustering_Overview.htm. 2005.*

Billerbeck, B. et al. "Query Expansion Using Associated Queries," *CIKM '03: Proceedings of the twelfth International conference on Information and knowledge management*, pp. 2-9, New York, NY, USA, 2003. ACM.

Boldi, P. et al. "The Query-flow Graph: Model and Applications," *CIKM '08*, 2008.

Cao, H. et al. "Context-aware Query Suggestion by Mining Click-through and Session Data," *KDD '08*, 2008.

Charikar, M. "Similarity Estimation Techniques from Rounding Algorithms," *STOC*, 2002.

Chien, S. and Immorlica, N. "Semantic Similarity Between Search Engine Queries Using Temporal Correlation," *WWW '05: Proceedings of the 14th international conferences on World Wide WEB*, pp. 2-11, New York, NY, USA, 2005. ACM.

Chirita, P.A. et al. "Personalized Query expansion for the Web," *SIGIR '07: Proceedings of the 30th annual international ACM SIGIR conference on Research and development in information retrieval*, pp. 7-14, New York, NY, USA, 2007. ACM.

Craswell, N. et al. "An Experimental Comparison of Click Position-bias Models," *WSDM '08: Proceedings of the international conference on Web search and data mining*, pp. 87-94, New York, NY, USA, 2008. ACM.

(Continued)

*Primary Examiner* — Syed Hasan
(74) *Attorney, Agent, or Firm* — Weaver Austin Villeneuve & Sampson LLP

(57) ABSTRACT

An optimization-based framework is utilized to extract broad query aspects from query reformulations performed by users in historical user session logs. Objective functions are optimized to yield query aspects. At run-time, the best broad but unspecified query aspects relevant to any user query are presented along with the results of the run time query.

23 Claims, 4 Drawing Sheets

(56) References Cited

OTHER PUBLICATIONS

Cucerzan, S. and Brill, E. "Extracting Semantically Related Queries by Exploiting User Session Information," http://research.micorsoft.com/users/silviu/Paper/np-www06.pdf, Unpublished draft, 2006.

Cui, H. et al. "Probabilistic Query Expansion Using Query Logs," *WWW '02: Proceedings of the 11$^{th}$ international conference on the World Wide Web*, pp. 325-332, New York, NY, USA, 2002. ACM.

Fonseca, B.M. et al. "Concept-based Interactive Query Expansion," *CIKM '05: Proceedings of the 14$^{th}$ ACM International conference on Information and knowledge management*, pp. 696-703, New York, NY, USA, 2005. ACM.

Fuxman, A. et al. "Using the Wisdom of the Crowds for Keyboard Generation," *WWW '08: Proceedings of the 17$^{th}$ international conferences on World Wide WEB*, pp. 61-70, New York, NY, USA, 2008. ACM.

Jansen, B.J. et al, "A Temporal Comparison of Altavista Web Searching," *Journal of the American Society for Information Science Technology*, 56(6): 559-570, 2005.

Jones, R. et al. "Generating Query Substitutions," *WWW '06: Proceedings of the 15$^{th}$ international conferences on World Wide WEB*, pp. 387-396, New York, NY, USA, 2006. ACM.

Silverstein, C. et al. "Analysis of a Very Large Web Search Engine Query Log," *SIGIR Forum*, 33(1):6-12, 1999.

Vlachos, M. et al. "Identifying Similarities, Periodicities and Bursts for Online Search Queries," *SIGMOD: Proceedings of the 2004 ACM SIGMOD International Conference on Management of data* pp. 131-142, New York, NY, USA, 2004. ACM.

\* cited by examiner

MINING BROAD HIDDEN QUERY ASPECTS FROM USER SEARCH SESSIONS

BACKGROUND OF THE INVENTION

This invention relates generally to search engines and queries.

The World Wide Web has grown dramatically over the last few years and search engines have become the primary mode of discovering and accessing web content for a large fraction of the users. However, even though the users employ search engines for critical information access tasks, they are remarkably laconic in describing their information needs. This behavior might be an outcrop of many factors. Users often use search engines for performing research on unfamiliar topics. Hence, they might skip important details in search queries because they aren't aware of them or haven't built up the correct vocabulary yet. In some other cases users neglect to add certain terms to queries because they believe the terms are obvious from the context or they aren't aware of other ambiguous senses of their incomplete queries. Search engines themselves might reinforce this behavior by not properly taking into account the extra information when the users do provide long descriptive queries.

SUMMARY OF THE INVENTION

A further understanding of the nature and advantages of the present invention may be realized by reference to the remaining portions of the specification and the drawings.

Embodiments of the invention find query aspects, that although not specified by the user, may be what the user had in mind and will suggest the query aspects and in some instances run the query with the unspecified aspects. The aspects are tailored to be sufficiently broad to apply to many different queries while being specific enough to accurately describe the hidden intent of the user.

Embodiments employ an optimization-based framework to extract broad query aspects from query reformulations performed by users in historical user session logs. Objective functions are optimized to yield query aspects.

One aspect relates to a computer-implemented method for providing search results. The method comprises analyzing search logs for query reformulations, extracting query reformulations from the analysis of the search logs, clustering the extracted query reformulations into clusters, selecting a group of the clustered extracted query reformulations, selecting clustered query reformulations from among the group of clustered extracted query reformulations so as to maximize a similarity measure, and presenting the clustered extracted query reformulations along with the results of a search.

Another aspect relates to a computerized searching system. The system is configured to analyze search logs for (i) a first query by a user comprising a first search term, followed by (ii) a second query comprising the first search term and a qualifier not initially specified in the first query. The system is further configured to determine k aspects of the qualifier, receive an original query at run time, and present to the user in response to the original query at least one of the k aspects along with results of the original query.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Query aspects may include query qualifiers (i.e., terms added to queries during reformulations). These reformulations are monitored and logged on a regular basis, at a time before a particular search of interest, in certain embodiments of the invention. Embodiments find such aspects and upon receiving any original query at run-time, the query qualifiers can be covered by some number of aspects, which are then presented to the user along with results of the original query. Such actions taken before a current, or new search is undertaken are referred to as "offline," whereas actions taking place to return search results for a new search may be referred to as "online" or as "run time."

Figure 1:
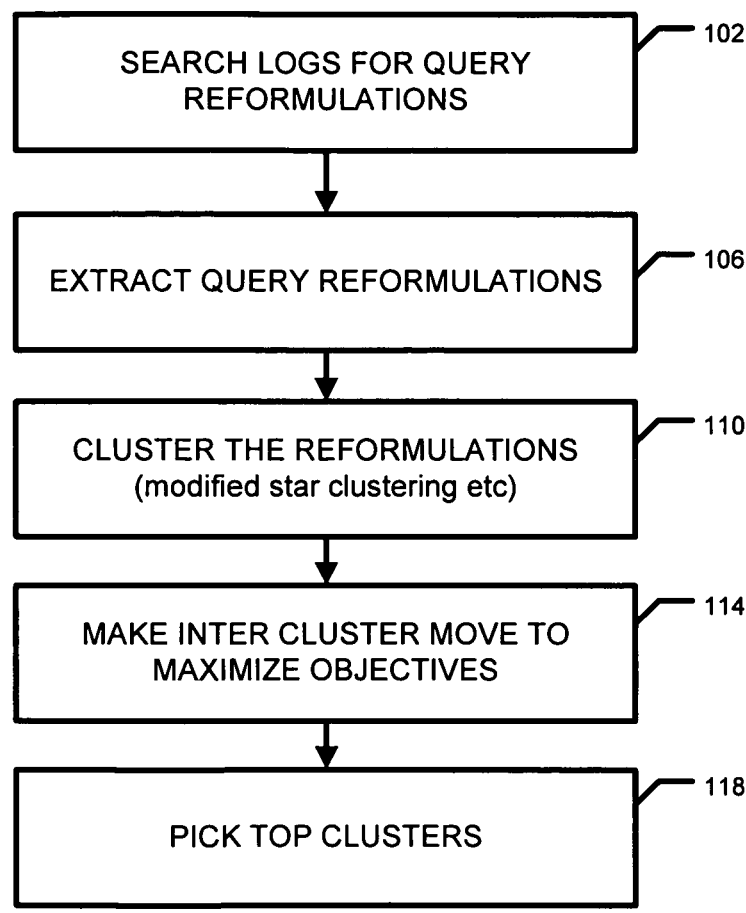
FIG. 1 is a flow chart of method of offline steps embodiments may utilize.

FIG. 1 is a flow chart illustrating offline activities. While such steps generally occur offline, or prior to run time of a current search, it should be understood that in some embodiments one or more of the steps may occur at run time.

In step 102, the system searches logs for query reformulations. For all or a subset of the query reformulations found, the system extracts and stores the query reformulation and optionally other information relating to the reformulations in step 106. In one embodiment, only a subset of query reformulations that exceed a threshold are utilized. For example, a threshold of query reformulations that result in a user click may be utilized. The threshold will of course vary depending on user traffic and the particular search engine and related databases, but in one example, only query reformulations resulting in more than about four to five hundred clicks and associated views of a page/site per month would be utilized.

Next, in step 110 the system clusters the extracted reformulations. Modified star clustering is one of many methods that may be employed by embodiments of the invention in order to pick the set A of N query aspects. The aim is to build the set A such that, with the best k aspects being picked for each query, and the total similarity between the query qualifiers and the corresponding k aspects per query are maximized, as seen in the table below.

Algorithm 2 Modified Star Clustering

1: input: set of qualifiers $v = \cup_{q \in Q} l(q)$, qualifier frequencies $L(v) \forall v \in v$, threshold $\sigma$, N
2: Create a graph $g = (v, \epsilon)$ where $v$ is the set of qualifiers, and $\epsilon = \{(i, j) | cosSim(i, j) > \sigma\}$
3: $n \leftarrow 0$, Left $\leftarrow v$, $A \leftarrow \{\phi\}$
4: while $n < N$ and Left $\neq \{\phi\}$ do
5:    hub $\leftarrow$ arg max$_{v \in Left}$ L(v)
6:    spokes $\leftarrow \{i | (hub, i) \in \epsilon\}$
7:    star $\leftarrow \{hub\} \cup$ spokes
8:    $A \leftarrow A \cup \{star\}$
9:    Left $\leftarrow$ Left \ star
10:    $n \leftarrow n + 1$
11: end while
12: output: set A of at most N query aspects Further details on the modified star clustering process can be found in a paper by Javed A. Aslam, Ekaterina Pelekov, and Daniela Rus, entitled "The Star Clustering Algorithm for Static and Dynamic Information Organization," published in the Journal of Graph Algorithms and Applications, 8(1), 2004, hereby incorporated by reference in the entirety. Any other clustering technique may be employed, although the modified star technique is preferred. One advantage of the modified star method is that it does not require specification of how many clusters are desired. Other examples of clustering techniques that may be employed include, for example, original star, K-means, expectation maximization ("EM") or Metis.

In step 114, the system makes an inter cluster (local) move to maximize the number of user queries covered with the facet clusters that have been created. An embodiment of the local search technique associated with the inter cluster move is described in the table below.

Algorithm 4 Local-Search

1: input: set of queries Q, set of qualifiers $v = \cup_{q \in Q} l(q)$, maximum number of query aspects N
2: Initialize the set of query aspects A to the output of Algorithm 2 with at most N aspects
3: Compute the best k query aspects from A for each original query using Algorithm 1
4: repeat
5:    reselectK = "no"
6:    move $\leftarrow$ Best-Local-Move(Q, A, reselectK)
7:    if move = $\phi$ then
8:       reselectK = "yes"
9:       move $\leftarrow$ Best-Local-Move(Q, A, reselectK)
10:    end if
11:    if move $\neq \phi$ then
12:       Update A according to move
13:       if reselectK = "yes" then
14:          Recompute the best k query aspects from the new A for each original query using Algorithm 1
15:       end if
16:    end if
17: until move = $\phi$
18: output: set A of at most N query aspects Then in step 118 the system picks a subset of clusters from step 114. The number of clusters chosen and methodology of choosing the clusters may vary. In one embodiment the top 50-150 cluster are chosen, preferably the top 100.

Figure 2:
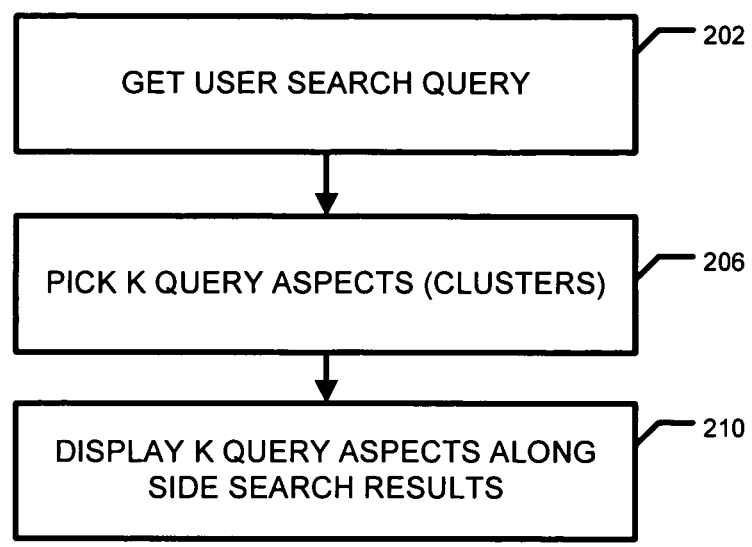
FIG. 2 is a flow chart of online steps embodiments may utilize.

FIG. 2 is a flow chart of online steps embodiments may utilize. In step 202, the system will receive a search query from a user. Then in step 206, the system will pick k aspects. In one embodiment this is done according to the pick-k process described below. Of course it should be understood that this may be done in numerous other ways.

The Pick-K Process

Given a set A of query aspects, and a query q, the method picks k aspects $a1, \ldots, ak \in A$ so as to maximize the similarity measure $F(l(q), \cup_{i=1}^{k} a_i)$. Embodiments maximize any similarity function of the form $$S(X, Y_1, \ldots, Y_k) = \frac{f_0(X) + \sum_i f(X, Y_i)}{g_0(X) + \sum_i g(X, Y_i)}, \quad (5)$$

where X and Yi are vectors in some finite-dimensional space, the functions $g_0()$ and $g()$ are non-negative, X is fixed from the start, and the Yi vectors must be picked from a set Y.

Algorithm 1
Pick-k

1: input: k, vector X, set of vectors $\mathcal{Y}$
2: $\alpha \leftarrow f_0(X)/k$, $\beta \leftarrow g_0(X)/k$, $Y \leftarrow \{\phi\}$, $n \leftarrow k$
3: while $n > 0$ do
4: $$M \leftarrow \left\{\text{argmax}_i \frac{f(X, Y_i) + \alpha/n}{g(X, Y_i) + \beta/n}\right\}$$
5:    If $|M| > n$, then keep any n elements in M and throw away the rest
6:    $Y \leftarrow Y \cup (\cup_{m \in M} Y_m)$
7:    $\alpha \leftarrow \alpha + \Sigma_{m \in M} f(X, Y_m)$
8:    $\beta \leftarrow \beta + \Sigma_{m \in M} g(X, Y_m)$
9:    $n \leftarrow n - |M|$
10: end while
11: output: picked elements $Y \subseteq \mathcal{Y}$ Then in step 210 the system will provide the k query aspects along side the search results. In other words, it will cause a client computer to display the query aspects along side the query results.

Figure 3A:
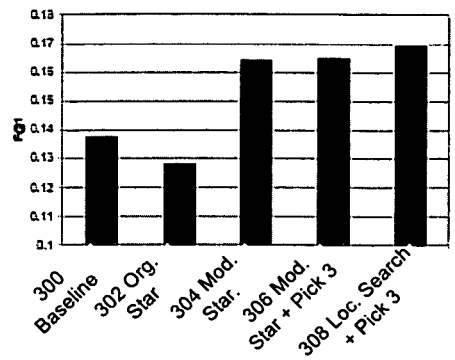
FIGS. 3A and 3B are graphs illustrating the performance of different embodiments as compared to a baseline.
Figure 3B:
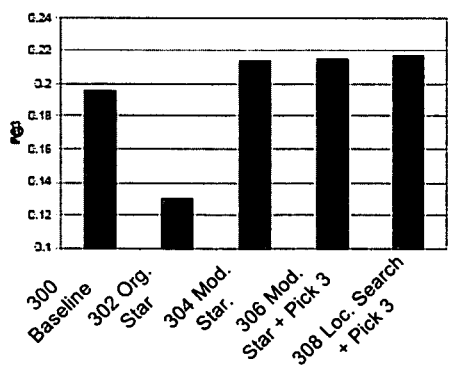

FIGS. 3A and 3B are graphs illustrating the performance of different embodiments (of selecting and presenting broad hidden query aspects) as compared to a baseline. FIG. 3A illustrates a performance comparison of the embodiments based on one broad aspect, that is k=1, whereas FIG. 3B illustrates a performance comparison of the embodiments based on three broad aspects, that is k=3. Bar 300 represents the baseline. Bar 302 represents an embodiment that employs original star clustering (ORGSTAR), without the local (inter cluster) move of step 114 described above. Bar 304 represents an embodiment that employs modified star clustering in step 110 (MODSTAR) given in Algorithm 2, but with without the local (inter cluster) move of step 114 described above and given in Algorithm 4 (LOCSEARCH). Bar 306 represents an embodiment that employs modified star clustering in step 110, together with the pick K algorithm of step 206. Bar 308 represents an embodiment that employs modified star clustering in step 110, together with the local (inter cluster) move of step 114, and the pick K algorithm of step 206.

Figure 4:
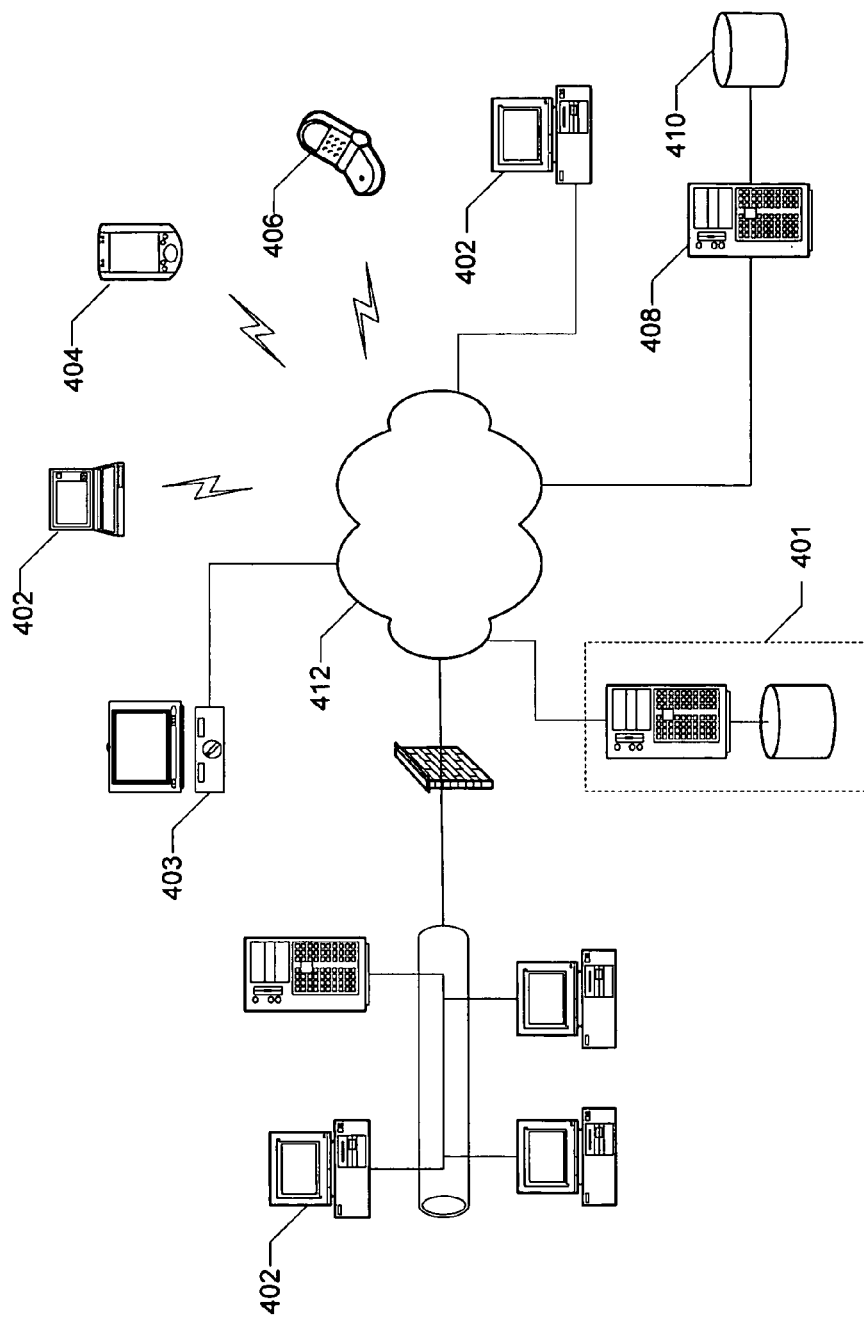
FIG. 4 is a simplified diagram of a computing environment in which embodiments of the invention may be implemented.

Searches in accordance with embodiments of the invention in some centralized manner. This is represented in FIG. 4 by server 408 and data store 410 which, as will be understood, may correspond to multiple distributed devices and data stores. The invention may also be practiced in a wide variety of network environments including, for example, TCP/IP-based networks, telecommunications networks, wireless networks, public networks, private networks, various combinations of these, etc. Such networks, as well as the potentially distributed nature of some implementations, are represented by network 412.

In addition, the computer program instructions with which embodiments of the invention are implemented may be stored in any type of tangible computer-readable media, and may be executed according to a variety of computing models including a client/server model, a peer-to-peer model, on a stand-alone computing device, or according to a distributed computing model in which various of the functionalities described herein may be effected or employed at different locations.

The above described embodiments have several advantages and are distinct from prior methods. For example, the extraction of broad aspects from query logs, and their use in query refinement, have several advantages over prior query suggestion methods. The first advantage has to do with the discovery and use of broad aspects and query suggestions. The broad nature of the query aspects ensures that enough data is available to reliably construct these aspects and predict when they apply to user queries. This is in contrast to query suggestions that are often applicable to specific queries and hence learned from significantly lesser amount of data. The availability of more data for analysis also implies that the technique avoids presenting the user with redundant query refinement options, as is often the case with query suggestions. Since by definition there are fewer broad aspects of queries than query suggestions, they can be better maintained without the need for manual intervention.

The second and more principal advantage is more subtle, and concerns the way users navigate the search results page. It has been shown in user eye-tracking studies as well as by modeling user clicking behavior that users scan search result pages extremely quickly and don't make a complete determination of the relevance of results before clicking. Users therefore acclimate to repetitive features in the search results page and use them to make clicking decisions. For example, the bolded words in the title of the result indicates to users that the title matched the query very closely, while the indented search result indicates to the user that this search result is somehow related to the previous one. When users are exposed to query suggestions, which by definition are specialized to the current query, they have to carefully read the suggested queries in order to decide whether to click on them. Since the users scan result pages very fast, they often skip the suggested queries as irrelevant content. By using a limited number of broad aspects of queries as options for refinement the user will then need less attention to interpret the aspects, for example "Reviews and Ratings," when they are presented to them.

While the invention has been particularly shown and described with reference to specific embodiments thereof, it will be understood by those skilled in the art that changes in the form and details of the disclosed embodiments may be made without departing from the spirit or scope of the invention In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method, comprising:
   extracting query reformulations from search logs, each of the query reformulations including an initial query and a query qualifier not specified in the initial query;
   clustering the extracted query reformulations into clusters using modified star clustering such that a set of query aspects is identified, the set of query aspects including query qualifiers of the query reformulations, wherein clustering includes generating star-shaped subgraphs using the query qualifiers, wherein clustering is performed without using the query reformulations or corresponding queries;
   receiving a search query;
   identifying query aspects for the search query from the set of query aspects such that a similarity measure is maximized; and
   presenting the identified query aspects along with results of the search query, wherein the identified query aspects are presented as options for refinement of the search query.

2. The method of claim 1, wherein clustering comprises selecting x clusters, wherein: $50<x<150$.

3. The method of claim 1, wherein extracting query reformulations comprises:
   obtaining each query reformulation for which the number of views of a corresponding page exceeds a threshold value within a given time period.

4. The method of claim 1, wherein each query reformulation comprises an initial query and a subsequent modifier added to the initial query.

5. The method of claim 1, wherein the search query includes a search term and one or more qualifiers, wherein identifying query aspects for the search query from the set of query aspects is performed such that a similarity measure based, at least in part, upon the qualifiers and the identified query aspects, is maximized.

6. The method of claim 1, wherein clustering comprises k means clustering.

7. The method of claim 1, further comprising:
   obtaining the results of the search query by executing the search query with the identified query aspects.

8. The method of claim 1, further comprising:
   maximizing a number of queries covered with the clusters that have been created.

9. The method of claim 1, wherein extracting query reformulations from search logs and clustering the extracted query reformulations into clusters are performed prior to receiving the search query.

10. The method of claim 1, wherein clustering comprises applying a cosine metric to determine pairwise similarity between the query qualifiers.

11. The method of claim 1, wherein the query qualifiers are vertices of the star-shaped subgraphs, wherein clustering comprises maintaining, for each of the query qualifiers, an indication of whether the corresponding vertex belongs to a star.

12. The method of claim 11, wherein clustering further comprises:
   maintaining, for each of the query qualifiers that belongs to a star, an indication of whether the vertex is a star center, a degree of the vertex, and a list of adjacent vertices.

13. The method as recited in claim 12, wherein clustering further comprises maintaining, for each of the query qualifiers that belongs to a star, a list of adjacent centers.

14. A computerized searching system configured to:
   extract, at a computing device, query reformulations from search logs, each of the query reformulations including an initial query and a query qualifier not specified in the initial query;
   cluster the extracted query reformulations into clusters using modified star clustering such that a set of query aspects is identified, the set of query aspects including query qualifiers of the query reformulations, wherein clustering includes generating star-shaped subgraphs using the query qualifiers, wherein clustering is performed without using the query reformulations or corresponding queries;

receiving a search query;

identify query aspects for the search query from the set of query aspects such that a similarity measure is maximized; and present the identified query aspects along with results of the search query, wherein the identified query aspects are presented as options for refinement of the search query.

15. The system of claim 14, wherein clustering comprises selecting x clusters, wherein: $50<x<150$.

16. The system of claim 14, wherein extracting query reformulations comprises:

obtaining each query reformulation for which the number of views of a corresponding page exceeds a threshold value within a given time period.

17. The system of claim 14, wherein each query reformulation comprises an initial query and a subsequent modifier added to the initial query.

18. The system of claim 14, wherein identifying query aspects for a search query from the set of query aspects is performed such that a total similarity between the query aspects is maximized.

19. At least one computer readable storage medium having computer program instructions stored thereon that are arranged to perform the following operations:

extracting query reformulations from search logs, each of the query reformulations including an initial query and a query qualifier not specified in the initial query;

clustering the extracted query reformulations into clusters using modified star clustering such that a set of query aspects is identified, the set of query aspects including query qualifiers of the query reformulations, wherein clustering includes generating star-shaped subgraphs using the query qualifiers, wherein clustering is performed without using the query reformulations or corresponding queries;

receiving a search query;

identifying query aspects for the search query from the set of query aspects such that a similarity measure is maximized; and presenting the identified query aspects along with results of the search query, wherein the identified query aspects are presented as options for refinement of the search query.

20. The computer readable storage medium of claim 19, wherein clustering comprises selecting x clusters, wherein: $50<x<150$.

21. The computer readable storage medium of claim 19, wherein extracting query reformulations comprises:

obtaining each query reformulation for which the number of views of a corresponding page exceeds a threshold value within a given time period.

22. The computer readable storage medium of claim 19, wherein each query reformulation comprises an initial query and a subsequent modifier added to the initial query.

23. The computer readable storage medium of claim 19, wherein the query aspects comprise terms in the query reformulations that were added to queries during reformulations.

* * * * *